(12) United States Patent
Strike

(10) Patent No.: US 6,328,480 B1
(45) Date of Patent: Dec. 11, 2001

(54) CONNECTORS FOR PROVIDING FIBRE OPTIC CONNECTION TO ETHERNET DEVICES HAVING TWISTED-PAIR CONNECTIONS

(75) Inventor: Richard J. A. Strike, London (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/442,237

(22) Filed: Nov. 17, 1999

(30) Foreign Application Priority Data

May 26, 1999 (GB) .................................... 9912125

(51) Int. Cl.⁷ ........................................... G02B 6/38
(52) U.S. Cl. .................. 385/75; 385/53; 385/147; 370/401; 370/463; 359/124
(58) Field of Search ............................. 385/75, 53, 147; 370/401, 463, 465, 445; 359/152, 124, 163, 139, 118; 439/180, 630

(56) References Cited

U.S. PATENT DOCUMENTS 5,880,864 * 3/1999 William et al. ...................... 359/124
6,222,852 * 4/2001 Gandy .................................. 370/463

FOREIGN PATENT DOCUMENTS 0 577 434 A1   7/1993 (EP) .
2 264 843A     9/1993 (GB) .

* cited by examiner

*Primary Examiner*—Phan T. H. Palmer
(74) *Attorney, Agent, or Firm*—Nixon & Vanderhye P.C.

(57) ABSTRACT

100BASE-FX connectivity for a port on 100BASE-TX Ethernet equipment is obtained by a fiber optic transceiver which is connected to a standard plug for a twisted pair connector and is also connected to signal detect inputs via the plug and thence by way of an isolating coupling to a logic circuit for switching the relevant physical layer device to the correct mode.

11 Claims, 4 Drawing Sheets

CONNECTORS FOR PROVIDING FIBRE OPTIC CONNECTION TO ETHERNET DEVICES HAVING TWISTED-PAIR CONNECTIONS

FIELD OF THE INVENTION

This invention relates to Ethernet network devices, and particularly to such devices having an integrated circuit (chip) which performs the function of a physical connection sub layer and physical media dependent layer between a media independent interface and a 'twisted-pair' connector. It is the general object of the invention to provide a comparatively simple and therefore inexpensive interface system which facilitates the connection of the device to a fibre optic link. In terms of current standards, one object of the invention is to provide 100BASE-FX connectivity on 100BASE-TX Ethernet equipment in accordance with IEEE standard 802.3.

BACKGROUND TO THE INVENTION

It is known to provide a 100BASE-FX PMD/PMA/PCS transceiver which plugs into a hub or switch to provide 100BASE-FX connectivity. The device uses a proprietary interface based on the IEEE802.3 MII interface. This method requires a MAC or repeater port to be provided on the system plus a connector. The parts required to perform these functions must be provided whether or not the optional transceiver is fitted.

The aim of this invention is to minimise the cost overhead carried by the host system when providing support for 100BASE-FX connectivity.

The invention is to provide an interface between the system and the optional module at the PMD/PMA interface. In prior systems this interface has been provided at the MII interface. The invention only requires comparatively few connections for the interface, so reducing the cost of the connector required. This also means the PHY device is part of the main system which ensures all management functions can be used. As suitable PHY devices generally also provide 10BaseT and 100BASE-TX support the PHY device can be used to provide 10/100 TX connectivity when not required for the 100BASE-FX module. This therefore means that in order to provide 100BASE-FX connectivity to a switch or hub it is simply necessary to switch the PHY for one of its 10/100 ports from 10/100 TX operation to 100BASE-FX operation and attach the PMD device (Fibre transceiver). This provides a considerable cost saving, in a multiport hub or switch when compared with the provision of a dedicated port and MII connector.

In one aspect of the invention, a fibre optic transceiver is intended to be external to the device and is not only connected to a standard plug for the twisted pair connector but is also connected by way, for example, of a driver to signal detect inputs for the male plug. In another aspect of the invention the corresponding signals from the connector are coupled by way of an isolating coupling, such as opto electric coupler, to a logic circuit which will switch the physical device from the 'twisted pair' (MLT3) mode to the 'fibre optic' (NRZI) mode if the fibre optic coupler is present and a signal is detected thereon.

DETAILED DESCRIPTION OF THE PREFERRED EMBODIMENT

Figure 1:
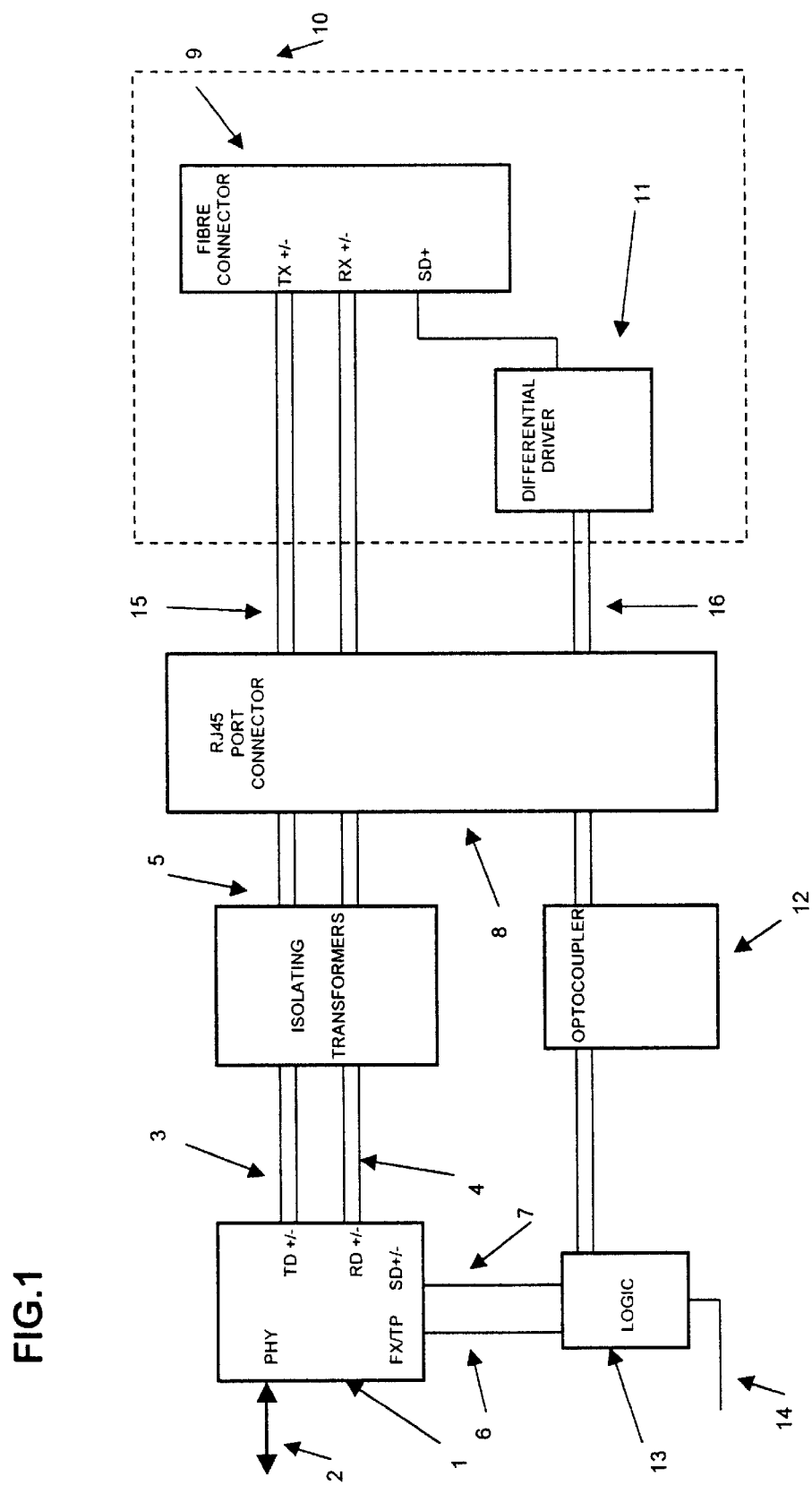
FIG. 1 is a schematic illustration of one system according to the invention, wherein a fibre optic transceiver is provided externally to the device for which fibre optic connectivity is to be provided.

FIG. 1 illustrates part of a network device with a packet based switching system such as the Ethernet system, and particularly a port which provides connection to and from the network device in which it is situated. In the particular arrangement shown, a physical layer device (normally termed 'PHY') 1 is constituted by an integrated circuit (chip) which provides a connection between a media independent interface (MII) 2 and a standard connector 8 herein exemplified by an RJ45 connector, which can normally cooperate with a standard 'male' plug to provide connection to a 'twisted-pair' line conforming with the aforementioned standard. The physical layer device 1 has a multiplicity of terminal pins which can receive or transmit signals in a defined format, independent of the physical medium to which the port may be attached, over the media independent interface 2. The physical layer device 1 has a pair of transmit terminal pins, shown as TD+/−, and a pair of receive terminal pins, shown as RD+/−. These are connected by way of lines 3 and 4 and by way of respective isolating transformers 5 to the connector 8. As thus far described, and as will be made clearer with reference to FIG. 2, the system is in well known form.

It is convenient to mention at the present stage that standard physical layer devices such as PHY 1 have two standard functions, denoted by respective inputs 6 and 7. The former is a switching between a 'fibre optic' mode and a 'twisted-pair' mode. The latter is a signal detect function.

The terms 'fibre optic' mode and 'twisted-pair' mode relate to the different signal formats appropriate for the different transmission media. In view of the substantial different physical characteristics, and for other reasons not directly relevant to the invention, transmission standards such as the aforementioned IEEE standard prescribe different signal formats for the transmission of signals over twisted-pair links and fibre optic links. In the particular standard indicated, the prescribed format for transmission at 100 Megabits per second over the medium of a twisted pair is a three level signal, known as MLT 3, each successive level in the signal (in its undistorted state) being determined by some predetermined combination of successive symbols. The prescribed format for transmission over a fibre optic link is NRZI wherein a polarity transition represents a logical 1 and the absence of a polarity transition denotes a logical 0. These specific formats are not necessary to the present invention but different formats will in general be required if the physical layer device 1 is to provide signals for connection to a twisted pair link or a fibre optic link selectively. Thus, as previously indicated, it is known for physical layer devices to include a terminal or combination of terminals denoted FX/TP, in FIG. 1 for switching between the two formats for output signals on the transmit pair TD and for received signals over the pair RD.

The lines 3 and 4 extending from the TD+/−signal and RD+/−signal terminals respectively on the physical layer device 1 are coupled to a set of isolating transformers 5 and corresponding connections extend to corresponding terminals (TD+/−signal and RD+/−) on the standard RJ45 connector which would normally include a standard RJ45 plug connected to transmit and receive pairs of a twisted pair cable.

In the embodiment shown in FIG. 1, a transceiver 9, which is intended to be any suitable transceiver for a fibre optic link, is disposed in an enclosure 10. Cable extends from the connector to the male part of the RJ45 connector. Although it is a straight forward matter to provide a short link composed of an RJ45 male plug connected to any suitable 100BASE-FX fibre transceiver, it is a more complex manner to ensure that the physical layer device (or particularly the relevant port of the PHY1) is switched to 100BASE-FX operation.

As will more particularly be described with reference to FIGS. 2, 3a and 3b, the transceiver 9 is connected by way of a 'signal detect' pin in order to achieve switching of the PHY 1 to 100BASE-FX operation and to provide the signal detect function. The connection may be modified if the transceiver provides a differential signal detect output (i.e. has an SD− signal pin as well as an SD+ pin).

The cabling system used for Ethernet over twisted-pair contains four pairs of wires. One is used for transmit (Tx+/−), one for receive (Rx+/−) and two pairs are spare. This example of the invention uses one of the spare pairs for signal detect (denoted SD+/−) and the other for power (ISOL+/−).

Broadly as shown in FIG. 1 and as will be more particularly described with reference to FIG. 2, the SD+ pin of transceiver 9 is connected to the input of a differential driver which is connected by way of lines 16 to respective pins on a RJ45 male plug 8a (FIG. 2), the corresponding pins being connected to an optocoupler 12 which provides signals to a logic circuit 13 which is coupled by way of the lines 6 and 7 to the FX/TP terminal and the signal detect terminals SD+/− on the physical layer device 1.

Figure 2:
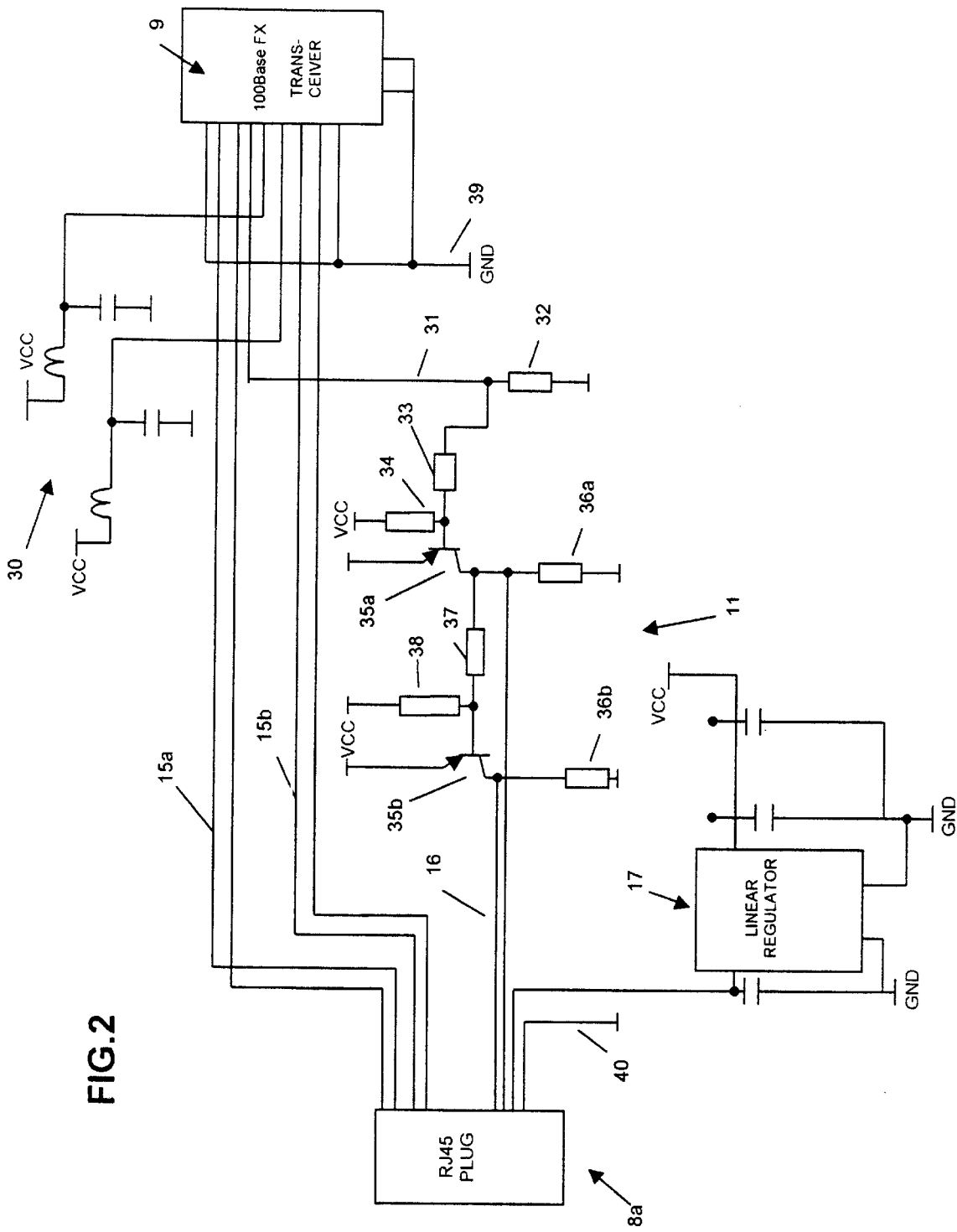
FIG. 2 is a detailed schematic of an external transceiver module shown in FIG. 1.

Reference is now made to FIG. 2 which illustrates a specific circuit diagram of the external module 10, which comprises the fibre optic transceiver and the differential driver 11 and which is preferably made as a single unit including a standard plug 8a for insertion in the port connector 8 shown in FIG. 1. The RD pins on the transceiver 9 are connected to the respective RD pins for the plug 8a by way of the pair of lines 15a and the TD pins of transceiver 9 are likewise connected to the respective TD pins of plug 8a by way of the pair of lines 15b. All these lines are denoted by the general reference 15 in FIG. 1.

The signal detect (SD) pin of the transceiver 9 is connected by way of a line 31 both to ground by way of a resistor 32 and by way of resistor 33 to the base of a transistor 35a which forms a differential driver with transistor 35b. The base of transistor 35a is connected to the positive voltage rail (VCC) by way of resistor 34 and the collector of transistor 35a is connected to ground by way of resistor 36a. The base of transistor 35b is connected to the collector of transistor 35a by way of resistor 37 and is also connected to the positive voltage rail VCC by way of resistor 38. The collector of transistor 35b is connected to ground by way of resistor 36b.

Various pins of the transceiver 9 are connected (in accordance with known practice) to ground by way of connection 39. Other pins, specifically the VCC and VCC1 pins of transceiver 9, are connected in accordance with known practice to the positive voltage rail VCC by way of low pass smoothing filters 30

In order to power the device an arrangement is illustrated here to provide power over on the unused pairs. In the case of a DC supply a circuit is included within the hub or switch to generate a power supply isolated from the other circuits within the hub/switch according to the Ethernet standards. This may be a DC or AC supply. This is connected to the ISOL +/− signal pair previously defined.

The ISOL+ pin (not specifically illustrated) of plug 8a is connected to the voltage rail VCC by way of a linear regulator 17 whereas the ISOL− pin (not specifically illustrated) is connected to ground by way of line 40.

The purposes of the differential amplifier 11 is to convert what is in essence a 'single ended' signal from the signal detect pin on transceiver 9 to a balanced signal on the lines 16 and to provide the current to drive the opto-electric isolator. This signal is used to provide' card present' and 'signal detect' information.

Figure 3A:
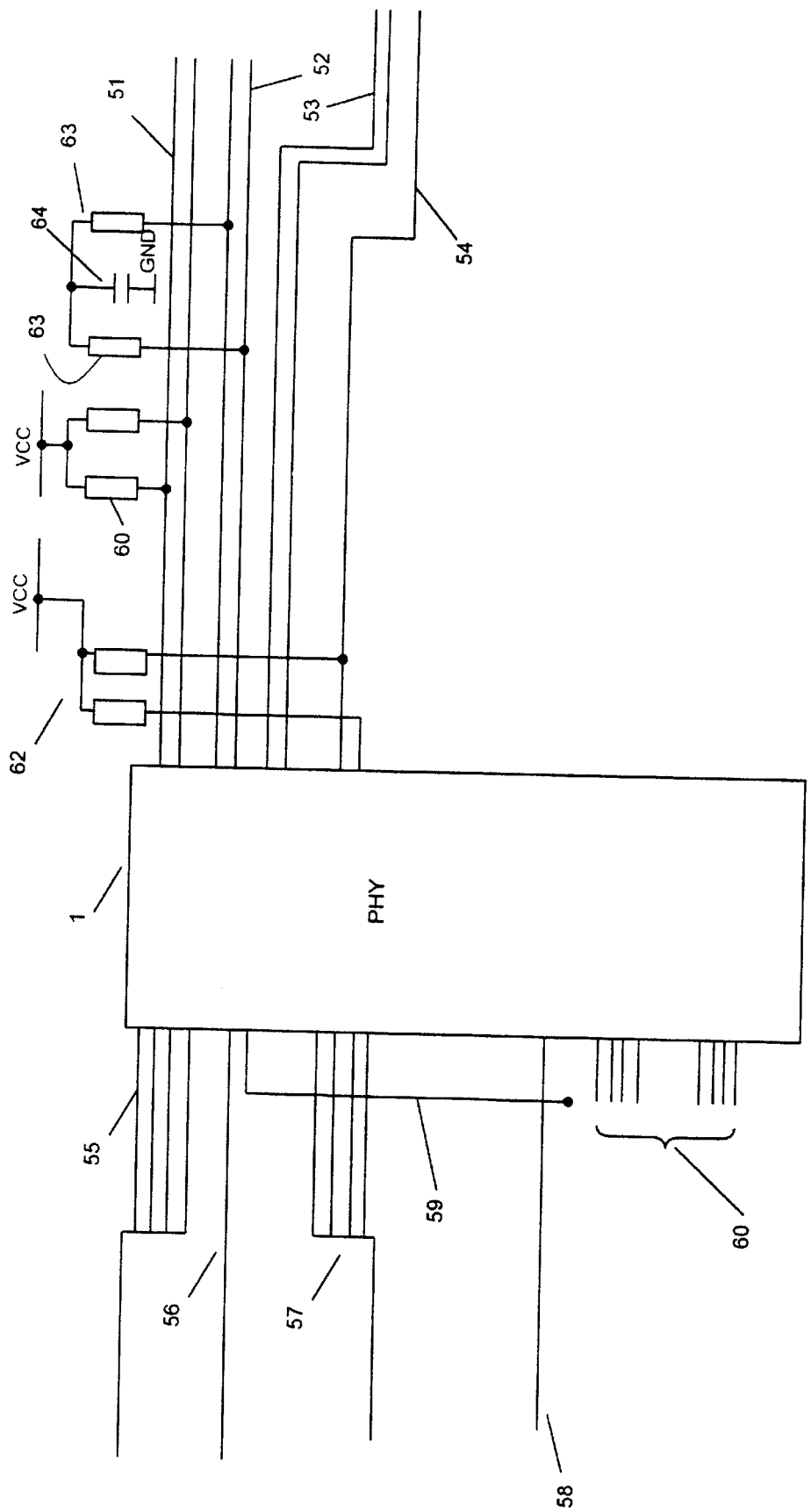
FIGS. 3a and 3b together illustrate a more detailed schematic showing the circuit connections in the system schematically described with reference to FIG. 1.
Figure 3B:
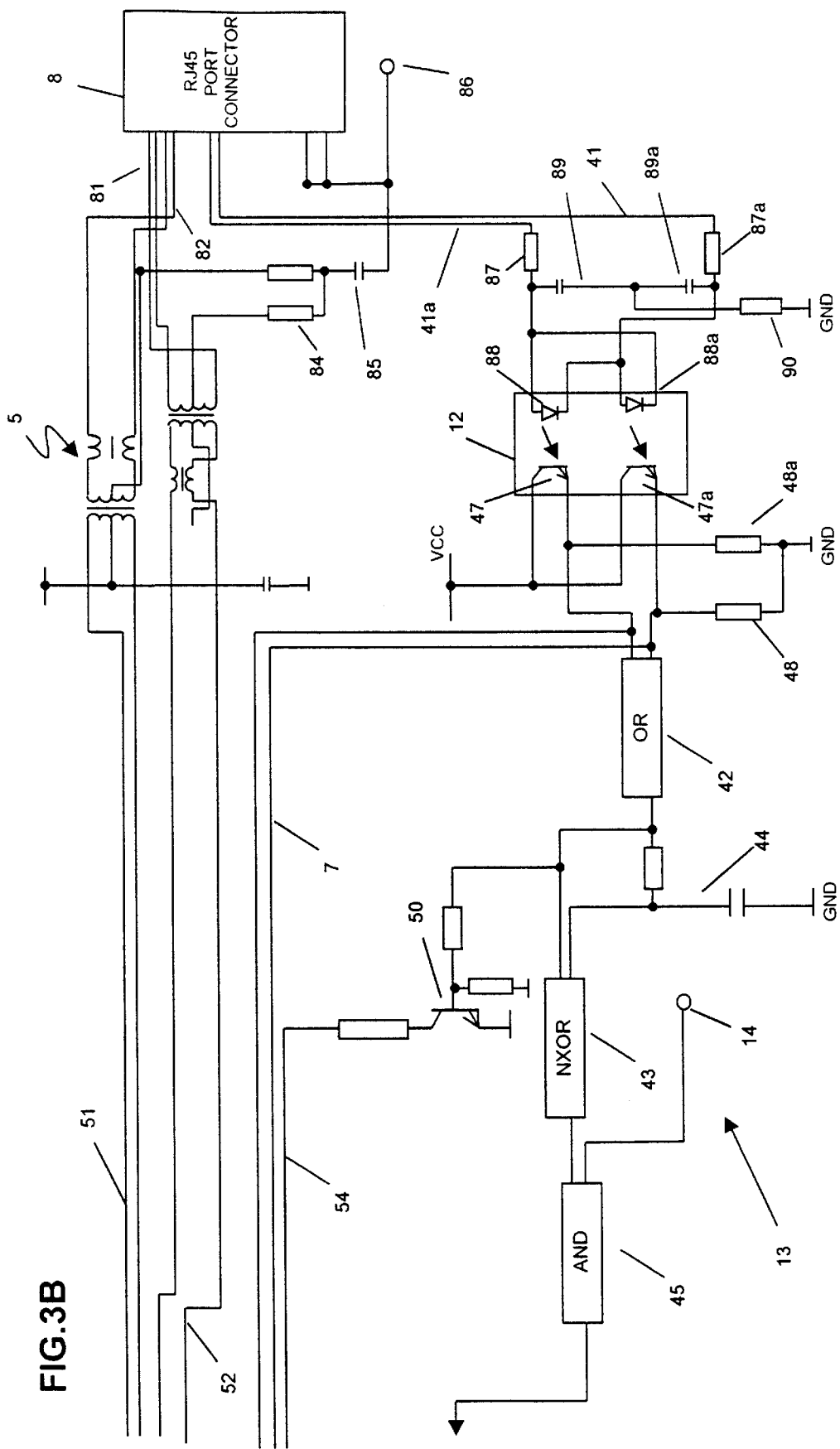

FIGS. 3a and 3b together illustrate in greater detail the port, basically comprising the physical layer device (PHY) 1 and the port connector 8, which is to be converted from 10/100 TX operation to 100BASE-FX operation when the external module is connected. Much of FIGS. 3a and 3b, particularly the physical layer device 1 in itself, its connections (55–60) to the remainder of the device in which it is incorporated, the isolating transformers 5 and the port connector 8 is in known form. Further, a variety of terminal pins relating to management of the PHY have been omitted for the sake of convenience.

Lines 55 to PHY1 connect to the TXD pins of the PHY, which may be constituted by a BCM5202 physical layer device. Line 56 connects to the TXEN pin, lines 57 connect to the RxD pins, input 58 represents the PHY reset line, line 59 connects to the TXER pin and also the pins, not specifically illustrated, conventionally described as CRS, Rx_ER, Rx_DV, Tx_CLK, Rx_CLK, COL, MDC and MDIO and lines 60 represent configuration inputs These connections are in known form.

Also, the TD pins may be connected to the positive voltage rail by way of resistor 60, the LNKLED may be connected to the positive voltage rail by way of resistor 62, and the RD pins are connected to around by way of respective resistors 63 and a common capacitor 64, in accordance with known practice LINKLED is the BCM5202 signal used for controlling the 10/100 Base-T/Tx or 100BaseT/Tx or 100Base-Fx mode.

The TD pins (both positive and negative) of PHY 1 are connected by way of the pair of lines 51 and the respective transformer in the isolating transformers 5 to the TX pins (referenced 82) of the port connector 8. The RD pins of PHY 1 are connected by way of a pair of lines 52 and the relevant section of the isolating transformers 5 to the RX pins on port connector 8 (denoted by reference 81). The signal detect pins of PHY 1 are connected by way of the pair of lines 7 to the output of the opto-coupler 12 as soon to be described. The LNKLED pin of PHY 1 is connected by way of line 54 to the output of a transistor 50 soon to be described.

The centre taps of the transformer sections of transformer 5 on the port connector side are connected by way of resistors 84 and capacitor 85 to grounded terminal 86 which is also connected to the 'shield' pins on port connector 8, in accordance with known practice.

The signal detect pins of port connector 8 are connected by way of the respective lines 41 and 41a to light-emitting diodes 88 and 88a in the opto-coupler 12. These diodes are in an anti-parallel connection. Across the diodes is connected a series pair of capacitors 89, 89a of which the connection point 89 is connected by way of resistor 90 to ground. These capacitors, the ground connection and series resistors 87, 87a provide appropriate termination and current limiting for the SD+/− signal.

The diodes 88 and 88a of the opto-coupler 12 are driven by the differential output on line 16 from differential driver 11 by way of the signal detect pins SD+/− on plug 8a and connector 8.

Each of the diodes 88 and 88a illuminates an opto-transistor 47 and 47a respectively. The collectors of both the transistors 47 and 47a are connected to the positive voltage rail VCC directly. The emitters of both transistors are connected by way of respective resistors 48 and 48a to ground. The emitters of both transistors are connected to the lines 7, which as previously described are connected to the signal detect lines of the PHY 1. The emitters of the transistors 47 and 47a also provide two inputs to an OR gate 42 of which the output is coupled to the base of a transistor 50 of which the collector is as previously mentioned connected by way of line 54 to the LNKLED pin of the PHY 1. The output of the OR gate 42 is connected by way of a low pass delay circuit 44 and also directly to respective inputs of the NXOR gate 43 of which the output is connected to one input of the AND gate 45. The other input of AND gate 45 is connected to the line 14 which receives a system reset signal in this case active low. The output of AND gate 45 is connected to the PHY reset line in this case also active low.

The main object of the opto-coupler 12 and the succeeding gating circuit to be described is to perform two basic functions. The first function is to switch the mode of the PHY 1 by way of its LNKLED and RESET pins whereas the other is to convey the status of the signal detect outputs of the fibre transceiver 9 to the signal detect inputs of the PHY 1. The opto-coupler 12 provides appropriate electrical isolation.

When the external module is attached and is powered up current will flow through the signal detect lines 41 and 41a. One or other of the transistors in the opto-coupler will be switched on, depending on the direction of current flow in lines 41a and 41. Thus there will be an output from OR gate 42 and this output, by way of transistor 50, will cause the input pin LNKLED of the PHY 1 to be pulled low. This pin sets the mode of the PHY when the device is reset. In order to reset the PHY 1 so that it will act on the setting of LNKLED, the circuit comprising the delay 44 and the gate 43 generates a reset pulse whenever the output of the OR gate 42 toggles. One of the inputs to the OR gate will always be high when the module is attached and both will be low when it is not attached. Therefore the output of the OR gate will always change state when the module is attached or removed. The resultant signal is fed to the PHY via AND gate 45 in conjunction with the system reset signal so that to PHY is reset by either the system reset or the attachment or removal of the external module.

The circuit for changing the PHY mode and the PHY pins required to set the mode is an illustration based on the BCM5202 device. An alternative detailed design may be required for other PHY devices. However the same general principles would still apply.

The circuit using 87, 87a, 89, 89a, 90 provides termination and current limiting for the SD+/− signal.

What is claimed is:

1. A communication device including a physical layer device which is switchable to provide transmission and/or reception of data packets in two different signal formats, intended for transmission over twisted pair and optical fibre respectively, a connector for a twisted pair line and a coupling between the physical layer device and the connector, a fibre optic transceiver, a plug compatible with said connector, signal lines connecting the plug and the transceiver for the transmission of signals in said signal formats and a link extending from a signal detect terminal of the fibre optic transceiver through said connector and an isolating coupling to a terminal of said physical layer device, said link including means responsive to a signal from said signal detect terminal to provide a switching signal for putting the physical layer device in a mode compatible with the signal format for optical fibre transmission.

2. A communication device according to claim 1 wherein said isolating coupling comprises an opto-electric coupler.

3. A communication device according to claim 1 wherein the means responsive to the signal from the signal detect terminal comprises a gating circuit for producing said switching signal in the presence of said signal from the signal detect terminal and a reset signal.

4. A communication device according to claim 1 wherein said physical layer device includes a pair of signal detect terminals and said link includes means coupled between the isolating coupling and said pair of signal detect terminals to convey a signal from said signal detect terminal to said pair of terminals.

5. A communication device according to claim 1 wherein said link includes, between said signal detect terminal and the isolating coupling, a differential driver.

6. A communication device according to claim 1 wherein one of said formats is NRZI.

7. A connection device comprising a plug compatible with a port connector for a twisted-pair transmission line, a transceiver for coupling signals to and from an optical fibre, pairs of signal lines coupling signal terminals of the plug and the transceiver for the coupling of signals from the plug to the transceiver and from the transceiver to the plug respectively, at least one signal detect terminal on said transceiver, at least a pair of signal detect terminals on said plug and driver means responsive to a signal at said signal detect terminal for providing a corresponding signal at said pair of signal detect terminals.

8. A connection device according to claim 7 wherein said driver means comprises a differential driver.

9. A port for a communication device for use in a packet-based data communication system, the port including:

a physical layer device which is operable to transmit and receive data packets in a first signal format comparable with transmission on a twisted-pair transmission line and a format compatible with transmission on a fibre optic link, said physical layer device being switchable between modes corresponding to said formats;

a port connector for coupling to a twisted-pair transmission line, said port connector including signal detect terminals; and a gating circuit responsive to an input signal to provide a switching signal for switching said physical layer device; and an isolating coupling between said signal detect terminals and said gating circuit, said isolating coupling being responsive to the presence of a signal at the signal detect terminals to provide said input signal.

10. A port according to claim 9 wherein the isolating comprises at least one electro-luminescent device optically coupled to a phototransistor.

11. A port according to claim 9 wherein one of the said formats is NRZI.

* * * * *